No. 890,567. PATENTED JUNE 9, 1908.
J. J. LUCKEY.
CONE LOCK FOR BALL BEARINGS.
APPLICATION FILED MAY 9, 1907.
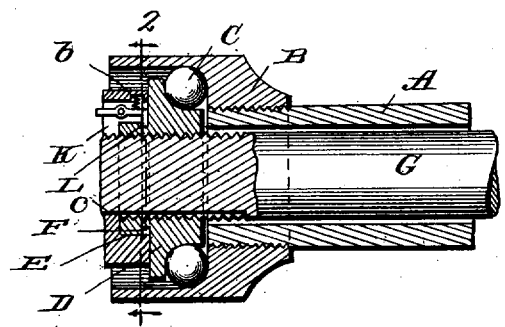
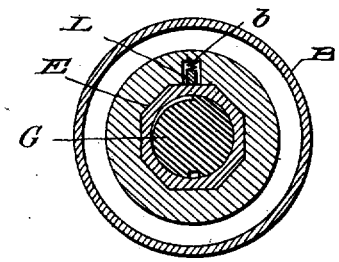
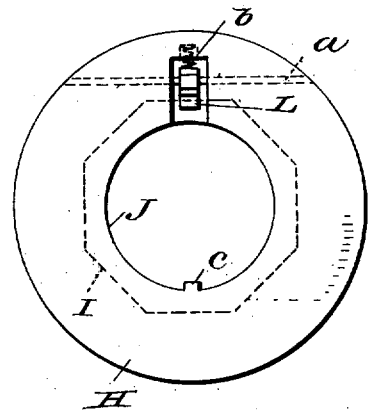
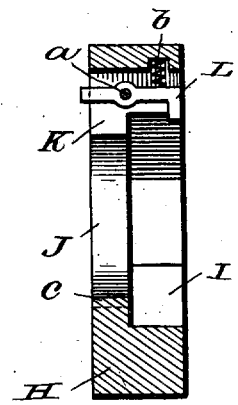
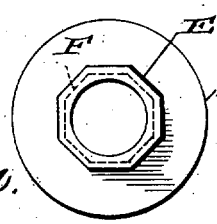
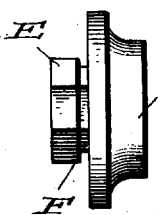
Witnesses
Geo. A. Byrne
H. H. Byrne
Inventor
John J. Luckey,
by Jerry A. Mathews
his Attorney
THE NORRIS PETERS CO., WASHINGTON, D.C.

UNITED STATES PATENT OFFICE.

JOHN J. LUCKEY, OF HOOD RIVER, OREGON, ASSIGNOR OF ONE-THIRD TO RALPH REED, OF HOOD RIVER, OREGON.

CONE-LOCK FOR BALL-BEARINGS.

No. 890,567.  Specification of Letters Patent.  Patented June 9, 1908.

Application filed May 9, 1907. Serial No. 372,660.

*To all whom it may concern:*

Be it known that I, JOHN J. LUCKEY, a citizen of the United States, residing at Hood River, in the county of Wasco and State of Oregon, have invented certain new and useful Improvements in Cone-Locks for Ball-Bearings, of which the following is a specification.

My invention relates to ball bearing hubs, more particularly to a combined nut and cone-lock therefor, and it has for its purpose to provide a device of that character whereby the cone member of the hub may be securely locked in the position to which it is adjusted when the parts are assembled, and means whereby the hub may be locked upon the axle.

My aim is to provide a ball bearing hub which shall embody all of the advantages of those now in use, combined with the above features, and at a cost of manufacture which shall be no greater than for those herein mentioned.

With these and other objects in view which shall be pointed out in the following specification and claims, my invention is disclosed in its preferred form in the accompanying drawing in which,—

Figure 1, is a longitudinal section view of a hub showing my device in applied position. Fig. 2, is a transverse section of Fig. 1 in the line 2—2. Fig. 3, is an enlarged end plan view of the locking means. Fig. 4, is a transverse section thereof. Fig. 5, illustrates the nut, and, Fig. 6, is a side elevation of the same.

Referring now to the views in detail, in which like letters of reference relate to corresponding parts in the different views shown, A is the ordinary boxing that is driven into the wheel hub, and B is usual cup having threaded engagement therewith and adapted to retain the anti-friction balls C.

D designates a cone screw threaded upon the axle G, and which with the cup B provide the ball chamber. The cone D is provided with a reduced tubular extension having an angular head E and an annular groove F.

Fitting freely over the threaded end of the axle G, and adapted to be fixed immediately adjacent the outer face and near the edge of the cone D is the locking device or nut H which constitutes the essential part of my invention. This member H, has a circumferential exterior and has interiorly a polygonal sided chamber I whose sides are adapted to register with and closely fit against the sides of the head E. The depth of the chamber I is exactly equal to the length of the tubular extension of the cone D.

J designates an annular collar whose periphery is designed to close against the threads of the axle G. The nut H is cut away as indicated by K to provide a recess within which the locking member L may have pivoted movement upon the pin A. The spring $b$ maintains the pawl in operative position. The function of the locking pawl L is to engage with its angular edge within the groove E of the cone and thereby to prevent any lateral disconnection between that member and the locking piece H.

To prevent any turning movement of H and consequent loosening or tightening of the cone D, the threaded portion of the axle G has a longitudinal groove cut therein, and within which a projection or tongue $c$ is adapted to register when the parts are being assembled. Thus it may be readily seen that since the lock H is secured to the bolt against rotary movement, and to the cone against lateral movement each of said members will retain its proper positions.

I do not however wish to limit myself to this specific structure of locking means for the cone, and likewise the hub, for in my copending application for nut-lock is shown a different type which may be as readily applied in this instance.

Having now described my invention in full what I claim as new and desire to protect by Letters Patent is,—

1. In a device of the character set forth, the combination with an axle provided with a longitudinally extending groove, of a cone threaded on the axle and provided with a reduced tubular extension having an angular head and an annular groove, a locking member provided with a tongue for engagement in the groove of the axle and with an angular chamber for the reception of the angular head of said extension, and a pawl pivoted on the locking member and adapted to engage in the groove of said extension.

2. In a device of the class set forth, the combination with an axle, of a cone threaded thereon and provided with a projection having an angular nut-like head, a locking member mounted on the axle, connections between the locking member and the axle to prevent rotary movement of the locking member, said locking member having a socket to receive said nut-like head and prevent rotation of the cone, and means carried by the locking member and coöperatively engaging the cone projection to lock the cone and the locking member together to prevent longitudinal movement thereof.

3. In a device of the character set forth, the combination with an axle, of a cone threaded thereon and provided with a projection terminating in an angular nut-like head, a locking member mounted on the axle, said axle having a longitudinal seat, said locking member having a lug to enter said longitudinal seat, said locking member having a socket or chamber to receive said angular head, said locking member abutting said cone, and means carried by the locking member and coöperatively engaging the projection of the cone to prevent longitudinal movement of the locking member and cone.

In testimony whereof I affix my signature, in presence of two witnesses.

JOHN J. LUCKEY.

Witnesses:
  WELLS F. HARVEY,
  H. H. BYRNE.